United States Patent [19]
Lethiais

[11] Patent Number: 4,794,786
[45] Date of Patent: Jan. 3, 1989

[54] AUTOMATIC COMPRESSED AIR ECONOMIZER DEVICE INTENDED TO BE MOUNTED ON A PNEUMATIC COMPARATOR

[75] Inventor: Jean C. Lethiais, Le Neubourg, France

[73] Assignee: Regie Nationale des Usines Renault, Boulogne Billancourt, France

[21] Appl. No.: 166,412

[22] Filed: Mar. 18, 1988

Related U.S. Application Data

[63] Continuation of Ser. No. 29,381, Mar. 23, 1987, abandoned.

[30] Foreign Application Priority Data

Apr. 5, 1985 [FR] France .................. 85 05231

[51] Int. Cl.⁴ ............................................. G01B 13/10
[52] U.S. Cl. .................................................... 73/37.9
[58] Field of Search .............................. 73/37.5, 37.9

[56] References Cited

U.S. PATENT DOCUMENTS

| | | | |
|---|---|---|---|
| 3,253,456 | 5/1966 | Berglund | 73/37.5 |
| 3,477,276 | 11/1969 | Fortier | 73/37.5 |
| 4,550,592 | 11/1985 | Dechape | 73/37.5 |

FOREIGN PATENT DOCUMENTS 2700439 7/1978 Fed. Rep. of Germany ....... 73/37.9

Primary Examiner—Stewart J. Levy
Assistant Examiner—Joseph W. Roskos
Attorney, Agent, or Firm—Oblon, Fisher, Spivak, McClelland & Maier

[57] ABSTRACT

An automatic compressed air economizer mounted on a pneumatic comparator has a measuring capsule, a measuring element pneumatically connected to the measuring capsule and a source of filtered gas. The economizer includes a distribution unit, a valve distributor for permitting selective flow of filtered gas, a regulating jet, a measuring jet and an economizer jet. A circuit selector selectively and alternatively pneumatically connects the measuring jet to each of the economizer jet and the valve distributor, in response to the valve distributor. A manostatic relay has a pneumatic input connected between the measuring capsule and the measuring jet, and has an output pneumatically connected to the valve distributor, so that a pressure change in the measuring capsule due to a measuring operation causes the manostatic relay to actuate the valve distributor.

3 Claims, 5 Drawing Sheets

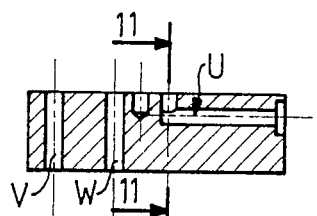
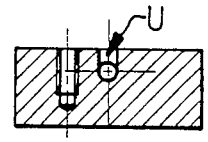
FIG-10  FIG-11
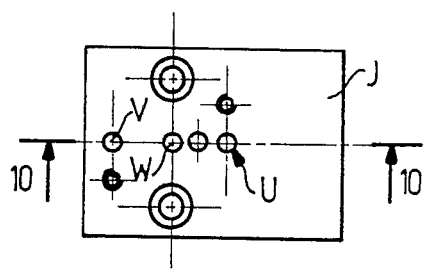
FIG-9
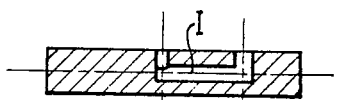
FIG-13
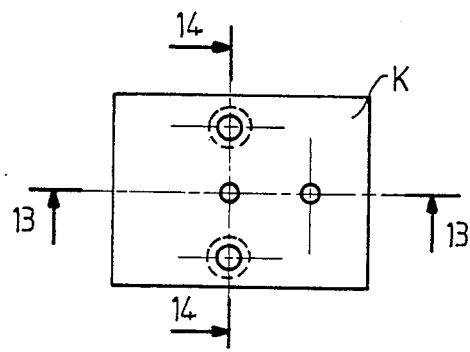
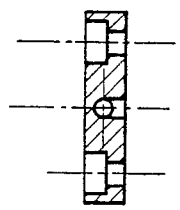
FIG-12  FIG-14

AUTOMATIC COMPRESSED AIR ECONOMIZER DEVICE INTENDED TO BE MOUNTED ON A PNEUMATIC COMPARATOR

This application is a continuation of application Ser. No. 029,381, filed on Mar. 23, 1987, now abandoned.

BACKGROUND OF THE INVENTION

1. Field of the Invention

This invention relates to the field of dimensional checking and more particularly relates to an automatic, compressed-air economizer device intended to be mounted on a pneumatic comparator.

The numerous applications of this economizer device are essentially those of the associated comparator:

dimensional checking of machined parts, either at the actual checking stations, or near machines, by self-checking;

gaging of parts being machined on various machine tools;

checking of the positioning, on the machine, of parts to be machined or of cutting tools.

SUMMARY OF THE INVENTION

The invention proposes achieving a substantial economy of pneumatic consumption in the between-checking periods, without resorting to a handling of fittings, with a particularly simple, effective and reliable device which energizes or de-energizes a manostat by means of a micro-escape.

According to an essential feature of the invention, this economizer device of the type placed between the measuring capsule of the associated comparator, and a valve distributor, comprises:

a regulating jet placed in an upper pipe between the measuring capsule and the distributor;

a measuring jet placed in a lower pipe between the measuring capsule and the distributor;

an economizer jet placed between the measuring jet and the filter;

a circuit selector placed between the economizer and measuring jets, and connected to said upper pipe upstream from the regulating jet;

and a manostatic relay connected to the distributor, to said lower pipe between the measuring jet and the measuring capsule, and upstream from the economizer jet;

these three jets and this circuit selector being housed inside a distribution unit provided with two covers, lower and upper, and on which the valve distributor and the manostatic relay are fastened.

The choice of a distribution unit serving at the same time as a base plate to receive a manostatic relay and a distributor makes it possible to make this air economizer very compact.

A single adjustment of the manostatic threshold to a very low level makes it possible to provide a considerable economy of air that is variable, depending on the combinations adapted and type of use, independent or in a battery.

BRIEF DESCRIPTION OF THE DRAWINGS

Other features and advantages of the invention will come out more clearly on reading the following description of a preferred embodiment, given by way of nonlimiting example, with reference to the accompanying drawings in which:

FIG. 9 represents a front view of the upper cover of this economizer device;

FIGS. 10 and 11 represent respectively the sections along planes 10—10 and 11—11 of this upper cover;

FIG. 12 represents a front view of the lower cover of this economizer device;

FIGS. 13 and 14 represent respectively the sections along planes 13—13 and 14—14 of this lower cover;

DETAILED DESCRIPTION OF THE PREFERRED EMBODIMENTS

Figure 1:
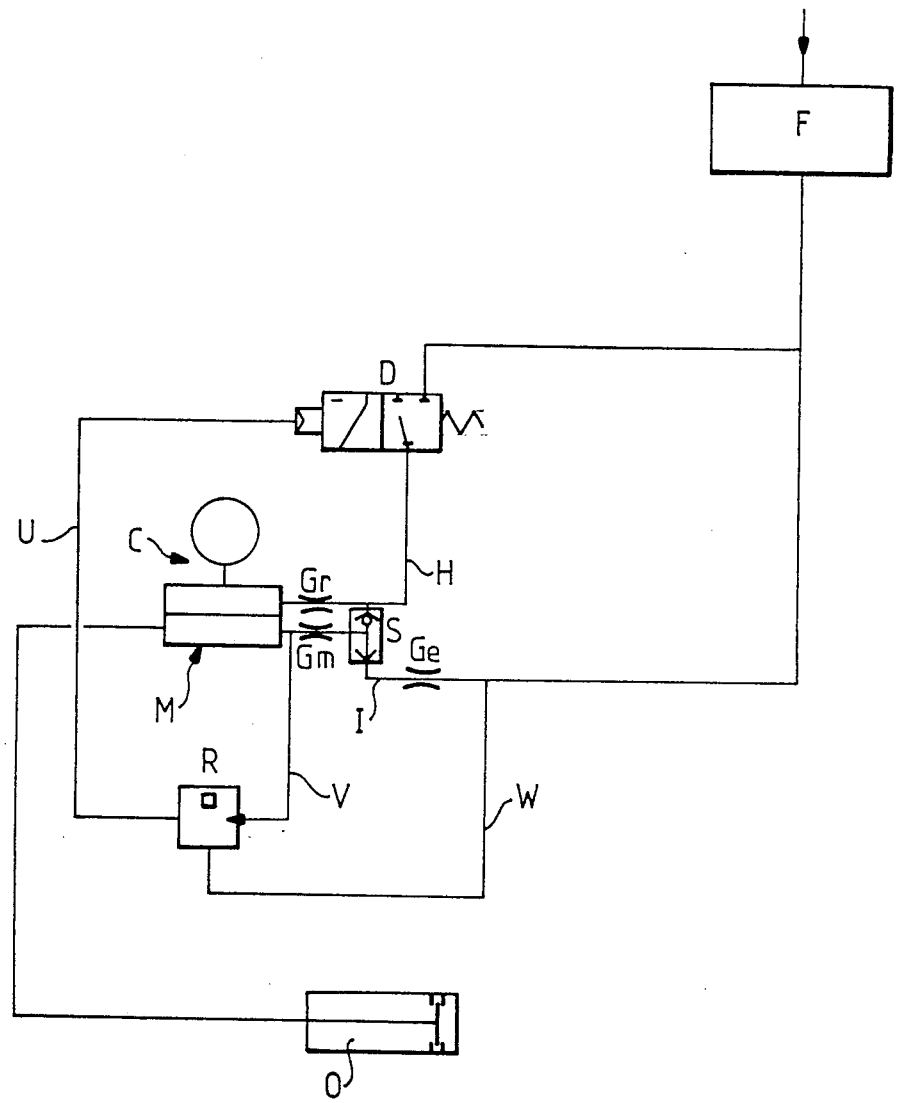
FIG. 1 represents a basic diagram of an economizer device according to the invention.

According to the basic diagram illustrated in FIG. 1, this air economizer device is mounted on a pneumatic comparator C connected to a measuring element 0. It is placed between measuring capsule M of this comparator, and a valve distributor D connected to the pneumatic system by a filter F. The valve distributor provides a selective flow of filtered gas when actuated.

It comprises a regulating jet Gr, a measuring jet Gm, an economizer jet Ge, a circuit selector S, a manostatic relay R, and appropriate connecting pipes. The circuit selector communicates measuring jet Gr with distributor D when distributor D is actuated.

Figure 2:
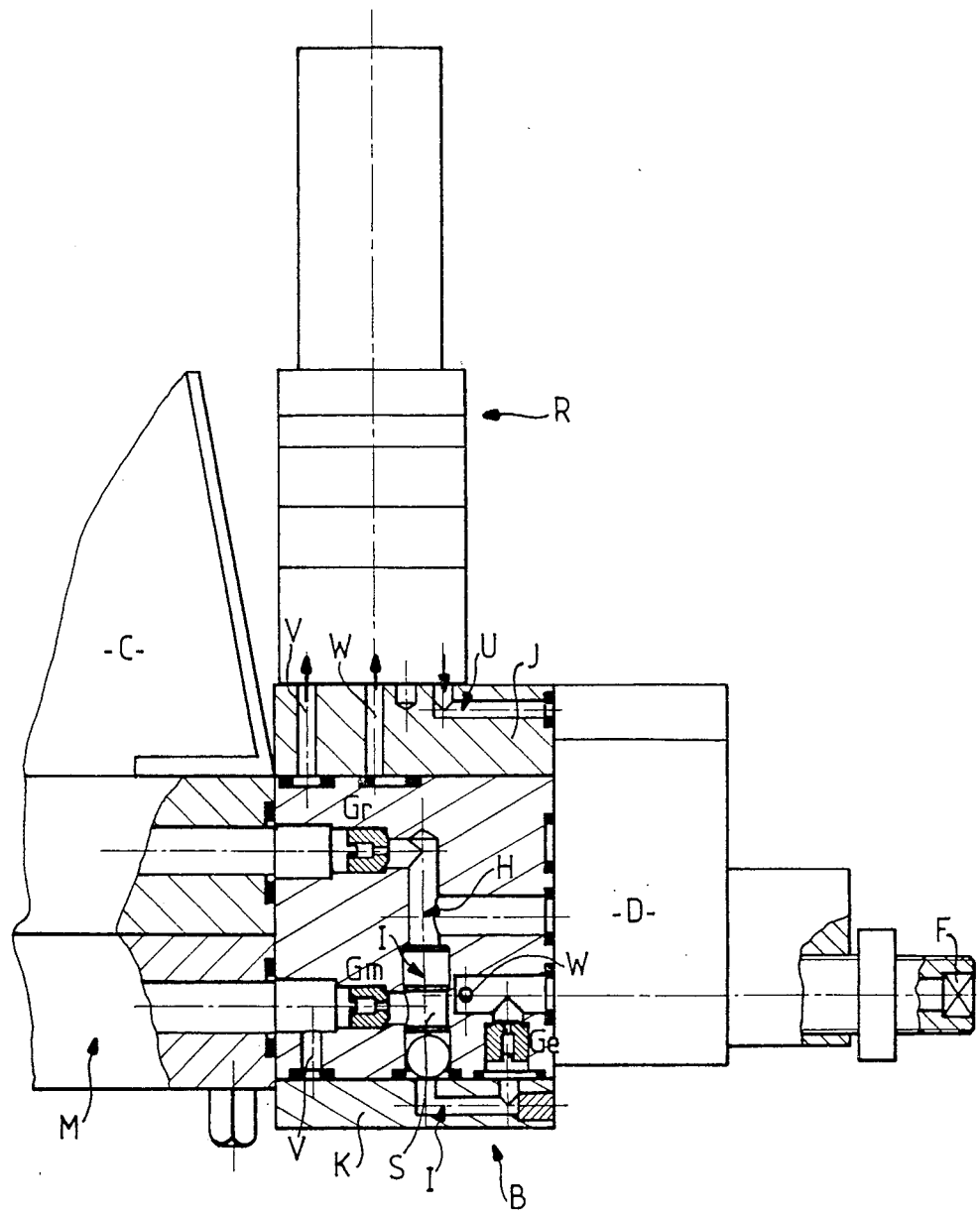
FIG. 2 represents a diagrammatic view of such a device showing particularly the distribution unit in longitudinal and axial section.
Figure 3:
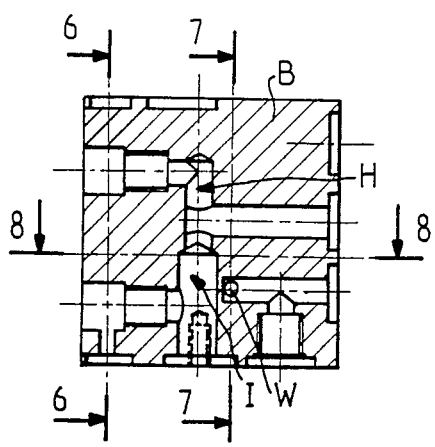
FIG. 3 represents a detailed front view in longitudinal and axial section of this distribution unit.
Figure 5:
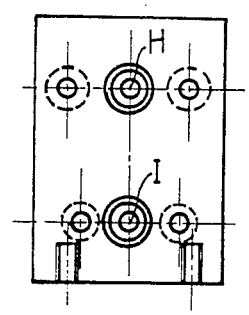
FIGS. 4 and 5 represent respectively the top and left views of the unit illustrated in FIG. 3.
Figure 4:
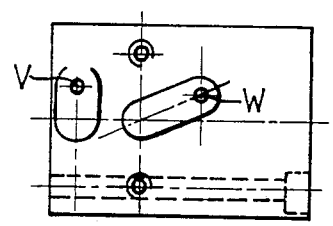
Figure 6:
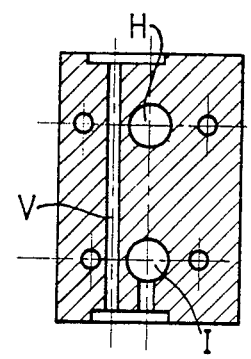
FIGS. 6, 7 and 8 represent respectively the sections along planes 6—6, 7—7 and 8—8 of the unit of FIG. 3.
Figure 8:
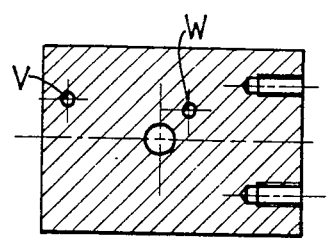
Figure 7:
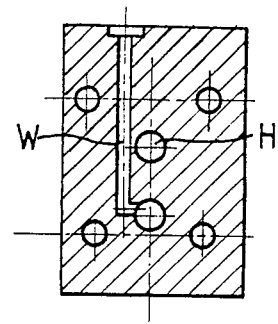
Figure 15:
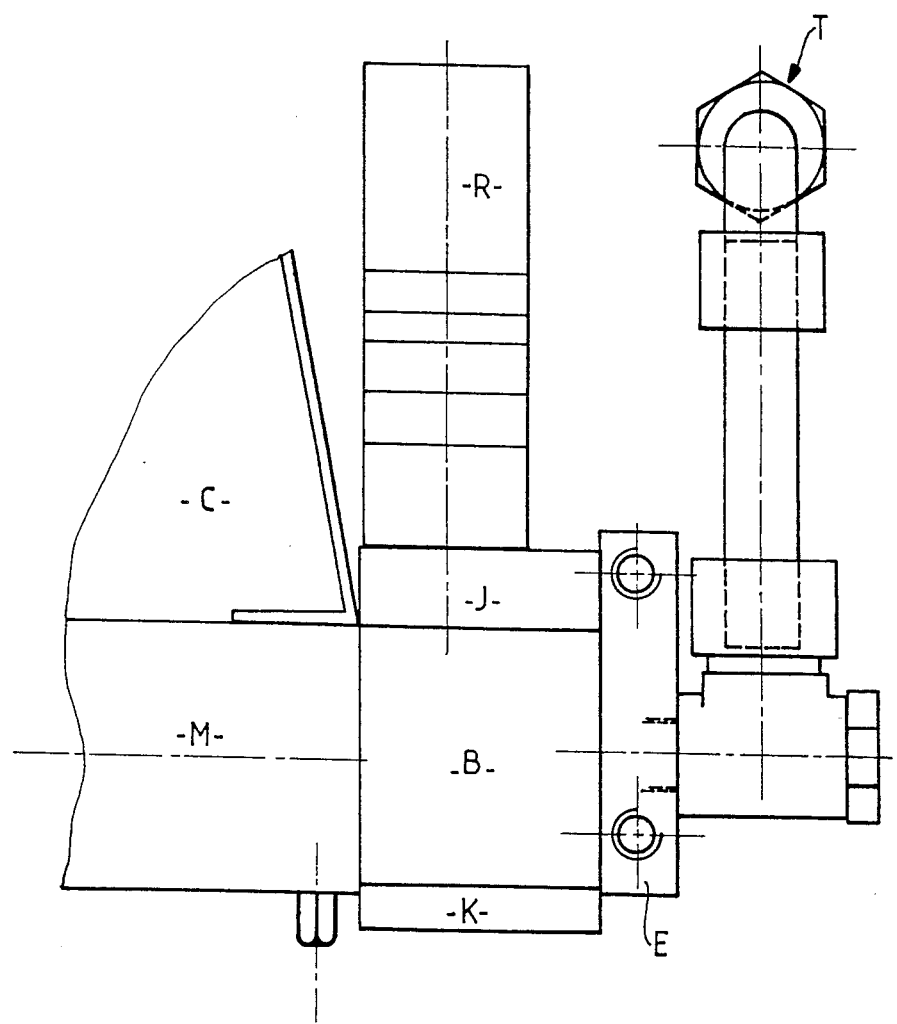
FIG. 15 represents a diagrammatic view of this economizer device for a battery assembly of comparators.

All these constituent elements are detailed in FIGS. 2 to 15, where FIGS. 2 and 15 are related respectively to independent assemblies and in a battery of comparators.

Jets Gr, Gm, Ge and circuit selector S are housed inside a distribution unit B equipped with two covers, upper J and lower K. Fastened to this unit are manostatic relay R, and valve distributor D for the independent version or a connector base E followed by a ramp T for connection to other comparators for the battery version.

Regulating jet Gr is placed in an upper pipe H between measuring capsule M and distributor D.

Measuring jet Gm is placed in a lowe pipe I between measuring capsule M and distributor D.

Economizer jet Ge is placed between measuring jet Gm and filter F.

Circuit selector S is placed between economizer jet Ge and measuring jet Gm and is connected to upper pipe H upstream from regulating jet Gr.

Manostatic relay R is connected to distributor D by a duct U, to lower pipe I between measuring jet Gm and measuring capsule M by a duct V, and upstream from economizer jet Ge by a duct W.

Ducts U, V, W and pipes H and I which connect the three jets Gr, Gm, Ge, circuit selector S, comparator C and distributors D all exhibit a sealing ring at the interfaces of distribution unit B and comparator C, distributor D, upper cover J and lower cover K.

The above-described economizer device functions as follows, with reference to FIGS. 1 and 2.

The air of the system filtered at F is regulated at an approximately constant pressure, for example four bars to provide a source of filtered gas.

Under waiting conditions, distributor D is closed and measuring element 0 is fed by economizer jet Ge because gas pressure part economizer et Ge causes circuit selector S to close the circuit to regulating jet Gr.

Under checking conditions where a part cooperates with the measuring element, the measuring pressure which controls manostatic relay R via line V increases, which triggers the controlling of distributor D by this manostatic relay. Pneumatic comparator C is then fed at full flow via distributor D to function under normal measuring conditions, circuit selector S closing the circuit of economizer jet Ge.

When the controlled part no longer cooperates with the measuring element, the measuring pressure drops and the manostatic relay stops controlling distributor D. The pneumatic comparator is again fed by economizer jet Ge.

I claim:

1. An automatic compressed air economizer mounted on a pneumatic comparator having a measuring capsule, a measuring element pneumatically connected to the measuring capsule and a source of filtered gas, said economizer comprising:

a distribution unit having a lower cover and an upper cover, distribution unit being mounted to said measuring capsule;

a valve distributor mounted to said distribution unit and comprising means for permitting selective flow of filtered gas from said source of filtered gas;

a regulating jet positioned in an upper pipe within said distribution unit and pneumatically connected between the measuring capsule and the valve distributor;

a measuring jet positioned in a lower pipe within said distribution unit and pneumatically connected to the measuring capsule;

an economizer jet positioned within said distribution unit and pneumatically connected between said measuring jet and the source of filtered gas;

a circuit selector positioned within said distribution unit and comprising means for selectively and alternatively pneumatically connecting said measuring jet to each said economizer jet and said valve distributor, said circuit selector pneumatically connecting said measuring jet to said valve distributor when said valve distributor is activated to permit flow of filtered gas; and a manostatic relay mounted to said distribution unit, said manostatic relay having pneumatic inputs pneumatically connected to the lower pipe at a position between the measuring capsule and the measuring jet and to said source of filtered air, and having an ouput pneumatically connected to the valve distributor and comprising means for actuating the valve distributor, whereby a pressure change in the measuring capsule due to a measuring operation causes said monostatic relay to actuate the valve distributor.

2. Economizer according to claim 1, wherein pipes connecting the regulating, measuring and economizes jets, the circuit selector, the comparator and the distributor all have a sealing ring at the interfaces of the distribution unit and the comparator, the distributor, the lower cover, the upper cover.

3. Economizer according to claim 1 or 2, actuating a means for connection to comparators.

* * * * *